US005729453A

United States Patent [19]

Lee et al.

[11] Patent Number: 5,729,453

[45] Date of Patent: Mar. 17, 1998

[54] UNMANNED OPERATING METHOD FOR A CRANE AND THE APPARATUS THEREOF

[75] Inventors: Hyeong-rok Lee, Kumi; Jae-hoon Kim, TaeJeon; Moon-hyun Kang, Pusan, all of Rep. of Korea

[73] Assignee: Samsung Heavy Industries Co., Ltd., Seoul, Rep. of Korea

[21] Appl. No.: 413,512

[22] Filed: Mar. 30, 1995

[30] Foreign Application Priority Data

| | | | |
|---|---|---|---|
| Mar. 30, 1994 | [KR] | Rep. of Korea | 94-6497 |
| Mar. 30, 1994 | [KR] | Rep. of Korea | 94-6542 |
| May 4, 1994 | [KR] | Rep. of Korea | 94-9817 |
| Sep. 30, 1994 | [KR] | Rep. of Korea | 94-25062 |
| Dec. 31, 1994 | [KR] | Rep. of Korea | 94-40280 |

[51] Int. Cl.$^6$ .......... G06F 19/00

[52] U.S. Cl. .......... 364/424.07; 212/275

[58] Field of Search .......... 364/424.07, 148, 364/165; 212/273, 275, 277, 278

[56] References Cited

U.S. PATENT DOCUMENTS

| | | | |
|---|---|---|---|
| 5,291,390 | 3/1994 | Satou | 364/148 |
| 5,392,935 | 2/1995 | Kazama et al. | 212/278 |
| 5,490,601 | 2/1996 | Heissat et al. | 212/275 |

FOREIGN PATENT DOCUMENTS

| | | |
|---|---|---|
| 0342655 | 11/1989 | European Pat. Off. . |
| 3513007 | 12/1985 | Germany . |
| 3445830 | 6/1986 | Germany . |
| WO 9219526 | 11/1992 | WIPO . |
| WO 9405586 | 3/1994 | WIPO . |

OTHER PUBLICATIONS

Itoh et al., Application of fuzzy control to automatic crane operation, Proceedings of the IECON'93, vol. 1, Nov. 1993, Maui, pp. 161–164.

Yuzo Suzuki, Anti-Swing Control of the Container Crane by Fuzzy Control, Proceedings of the IECON'93, vol. 1, 15 Nov. 1993, Maui, pp. 230–235.

Johann Hipp, Laser-Sensoren für die Kranautomatisiering, F+H Fördern und Heben, vol. 42, No. 11, 2, Mainz, pp. 890–892.

O. Neubauer, Unsharfe Logik Lenkt krane, ZWF CIM Seitschrift für Wirtschaftliche Fertigung und Automatisierung, vol. 88, No. 11, 3, Munchen, pp. 534–535.

*Primary Examiner*—Gary Chin
*Attorney, Agent, or Firm*—Dilworth & Barrese

[57] ABSTRACT

An unmanned operating method for a crane for moving containers in use in a harbor and the apparatus therefor compensates the influence due to a disturbance such as the wind in driving the crane, detects the position and posture of the spreader and crane, thereby allowing the container to be attached and detached automatically. Accordingly, a crane automation for moving containers is achieved.

22 Claims, 14 Drawing Sheets

UNMANNED OPERATING METHOD FOR A CRANE AND THE APPARATUS THEREOF

BACKGROUND OF THE INVENTION

1. Field of the Invention

The present invention relates to an unmanned operating method for a crane and the apparatus thereof, and more particularly, to a crane used in a harbor for moving a container.

2. Description of Related Art

Generally, a crane is used for loading a ship with containers piled in a yard in a harbor or for unloading containers from a ship. Such a crane is provided with a spreader for holding and releasing a container, a hoist for moving the container up and down, and a trolley for moving the spreader horizontally. When the crane is driven manually, the trolley is driven horizontally at a maximum speed and then is rapidly decelerated at a constant position to reach a target position. In this case, it is difficult for the trolley to stop at the target position and the spreader sway is severely generated. Therefore, it takes much time to pick up or drop off a container in driving the crane manually. To overcome such a problem, there is proposed an unmanned operating method for a crane. In the unmanned operating method, a driving speed pattern of a trolley and hoist is pre-determined in order to minimize the spreader sway when reaching a target position, and the trolley and hoist are driven according to the driving speed pattern. The arrangement relationship between the driving speed pattern in the unmanned operating method and the trolley and hoist which are installed on a crane will be described with reference to FIG. 1.

FIGS. 1A and 1B explain an unmanned operating method for a conventional crane, in which FIG. 1A is a graph showing an example of the driving speed pattern in the conventional unmanned operating method and FIG. 1B is a schematic diagram of the trolley and hoist for a general crane. According to the conventional unmanned operating method, a constant driving speed pattern is preset as shown in FIG. 1A, and the trolley 20 or hoist 30 is driven for moving the container 10 as shown in FIG. 1B. The driving speed pattern of the trolley 20 and hoist 30 is separately obtained experimentally or empirically.

For example, if the driving speed pattern of FIG. 1A is for the trolley 20, the horizontal travelling speed of the trolley 20 is increased in a constant ratio at a starting time, is decreased at a constant point of time and is again increased to be a maximum speed. Then, the horizontal travelling speed of the trolley is maintained to be a maximum speed for a predetermined interval. When the trolley 20 is to be stopped, the traversing speed is made to be decreased in a constant ratio, is increased at a point of time and then is again decreased.

That is to say, when the trolley 20 stops at a target position, a method for varying and adjusting the driving speed of the trolley 20 and hoist 30 moderately has been conventionally used so that the spreader or container sways less. However, such conventional unmanned operating method generates frequent errors due to external factors like initial vibration of a spreader, the vibration of a control system or the wind. Thus, it is difficult to control exactly the sway of the spreader or the position of trolley. Also, according to the conventional unmanned operating method, since it is difficult to holding/releasing the container exactly, a separate driver is required. As the result, conventionally, the perfect automation of the crane cannot be realized.

SUMMARY OF THE INVENTION

It is an object of the present invention to provide an unmanned operating method for a crane by which a spreader can reach an exact target position with a less sway than that by the conventional method and a container is exactly held and released.

Another object of the present invention is to provide an apparatus for achieving the unmanned operating method according to the present invention.

The above object of the present invention is attained by an unmanned operating method for a crane having a spreader for holding/releasing a container being in a first target position for moving the container to a second target position, the method comprises the steps of:

inputting the position information of the first target position and second target position; calculating a reference driving speed pattern according to the input position information; detecting a sway angle of the spreader while driving the crane according to the reference driving speed pattern; compensating the reference driving speed pattern by a fuzzy operation according to an error value between the present state and target state of the crane; detecting the positions of the spreader and container after stopping at the target position; adjusting the position of the spreader according to the detected positions of the spreader and container; and picking up/dropping off the container.

The other object is attained by an unmanned driving apparatus for a crane having a spreader which can hold/release a container being in a first target position for moving the container to a second target position, the apparatus comprises:

position information inputting means for inputting the position information of the first target position and second target position; a fuzzy logic controller having a speed pattern generator for calculating the reference driving speed pattern of the crane according to the position information and a fuzzy operation controller for performing a compensation of the reference driving speed pattern of each point of time depending on external error factors according to a predetermined information when driving the crane according to the reference driving speed pattern, for allowing the spreader to stop at a target position with a less sway; and a position detector for providing sway information of the spreader during moving the spreader to the fuzzy logic controller and detecting the positions of the spreader and container when the spreader reaches a target position so that the spreader holds/releases the container exactly.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1A:
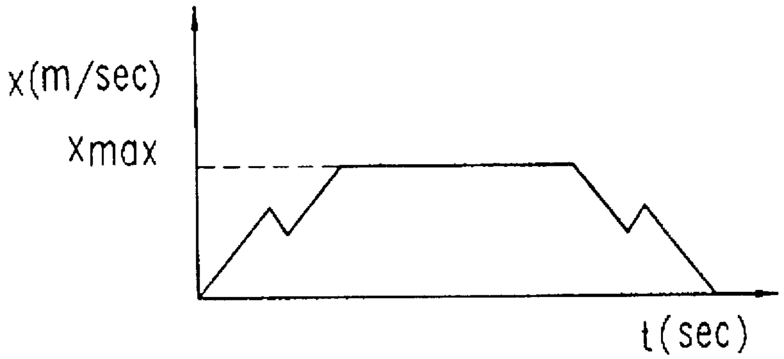
FIG. 1A (PRIOR ART)
FIGS. 1A and 1B are diagrams for explaining an unmanned operating method for a conventional crane.
Figure 1B:
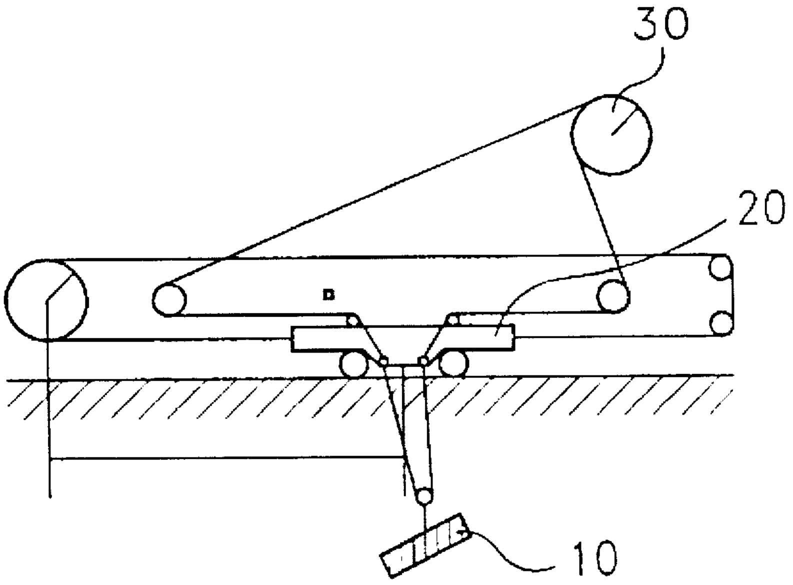
FIG. 1B (PRIOR ART)
Figure 2:
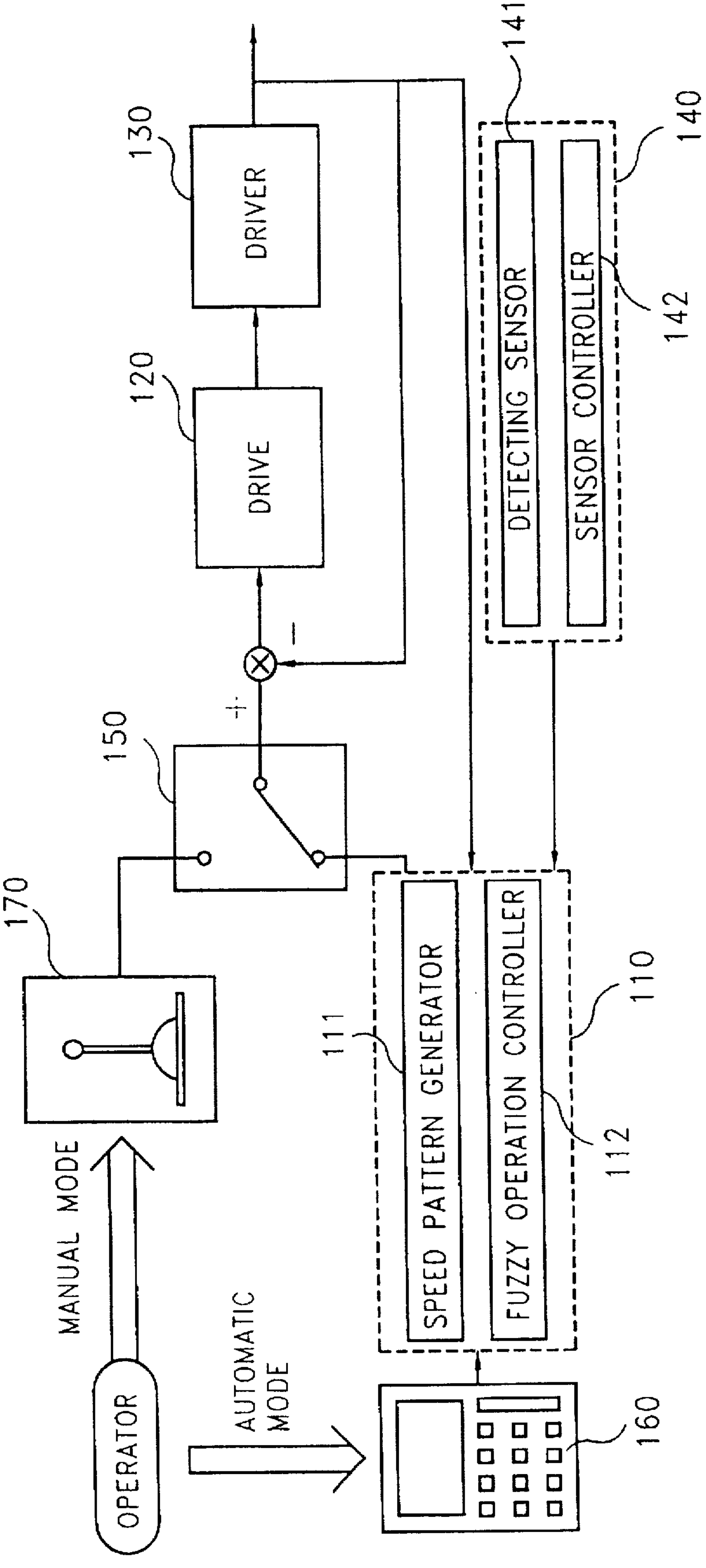
FIG. 2 is a block diagram of an unmanned driving apparatus for a crane according to the present invention.

As shown in FIG. 2, the unmanned driving apparatus for a crane according to the present invention includes a fuzzy logic controller 110, a drive 120 for driving various components of the crane, and a driver 130 for being driven according to signals of the drive 120. The unmanned driving apparatus for a crane according to the present invention further includes a position detector 140 for detecting the position and posture of the spreader and container. The position detector 140 has a sensor 141 and a sensor controller 142, which will be described in more detail when describing FIG. 3.

In the unmanned driving apparatus for a crane according to the present invention, there are installed an input key pad 160 for inputting data to the fuzzy logic controller 110, a master switch 170 for operating the crane manually on necessity and a switch 150 for selecting a manual mode or an automatic mode.

The fuzzy logic controller 110 has a speed pattern generator 111 for obtaining a reference driving speed pattern of a trolley and a fuzzy operation controller 112 for compensating the reference driving speed pattern obtained in speed pattern generator 111 according to the surrounding errors. Here, the speed pattern generator 111 generates each primary reference driving speed pattern $V_1$ and $V_2$ of the trolley and hoist by a microcomputer, etc. depending on the target position input to the input key pad 160 and the present states of trolley and hoist. If each of the primary reference driving speed pattern of the trolley and hoist is obtained, the speed pattern generator 111 executes a simulation to obtain adjusted values $\Delta V_1$ and $\Delta V_2$ through a fuzzy operation by fuzzy control rules with input values, i.e., the position of the trolley, the driven state of the hoist, the error between the present position (x, y, z) and target position due to the sway angle of the spreader and the error variation, the error between the present speed ($\dot{x}$, $\dot{y}$, $\dot{z}$) and target speed and the error variation, and the error between the present accelerated speed ($\ddot{x}$, $\ddot{y}$, $\ddot{z}$) and target speed and the error variation. The speed pattern generator 111 adds the adjusted values $\Delta V_1$ and $\Delta V_2$ with $V_1$ and $V_2$, respectively, to obtain each reference driving speed pattern of trolley and hoist, $V_T$ and $V_H$.

The fuzzy operation controller 112 operates the trolley and hoist according to the reference driving speed patterns $V_T$ and $V_H$ obtained from the speed pattern generator 111 and detects each moment error factors such as a sway angle of the spreader, disturbance due to the wind or present position to compensate the reference driving speed patterns $V_T$ and $V_H$ through the fuzzy operation. Here, the input values of the fuzzy operation are the error between the present states of the trolley and hoist and target states and the error variation, the error between the present driving speeds of the trolley and hoist and the driving speed by the reference driving speed pattern and the error variation, the error between the present sway angle supplied by the position detector and target sway angle and the error variation, and the error between the disturbances measured by a sensor and the error variation, and the output values are the compensated values of the reference driving speed patterns $\Delta V_T$ and $\Delta V_H$. The input values are deducted by the fuzzy control rules. The fuzzy control rules are established by human experiences and rational thoughts. For example, in the case where input variables are X and Y and an output variable is Z, the fuzzy control rules are defined as follows.

1. If X is $A_1$ and Y is $B_1$, then, Z is $C_1$.

2. If X is $A_2$ and Y is $B_2$, then, Z is $C_2$.

The fuzzy control rules used in the unmanned driving apparatus for a crane according to the present invention are as follows.

Rule 1. If a vibration angle $x_3$ is generated much in a negative direction but the position and state ($x_1$, $x_2$) of the trolley/hoist do not reach a target state, then, the accelerated speed is increased.

Rule 2. If a vibration angle $x_3$ is generated much in a positive direction but the position and state ($x_1$, $x_2$) of the trolley/hoist do not reach a target state, then, the accelerated speed is decreased.

That is to say, the fuzzy operation controller 112 executes a fuzzy deduction in accordance with the control rules obtained based on the operator's experiences and compensates the reference driving speed patterns.

Meanwhile, the position detector 140 detects with a sensor 141 the sway angle of the spreader when moving the trolley and supplies the detected sway angle to the fuzzy operation controller 112. The method of measuring the sway angle with the sensor 141 of the position detector 140 will be described in detail later. Also, the position detector 140 detects the target position and posture of the container and spreader and supplies them to the controller of the trolley and hoist, thereby enabling the spreader of the crane to pick up or drop off the container at a precise position. The method of detecting the position and posture of the spreader and container with the position detector 140 will be described in detail later.

Figure 3:
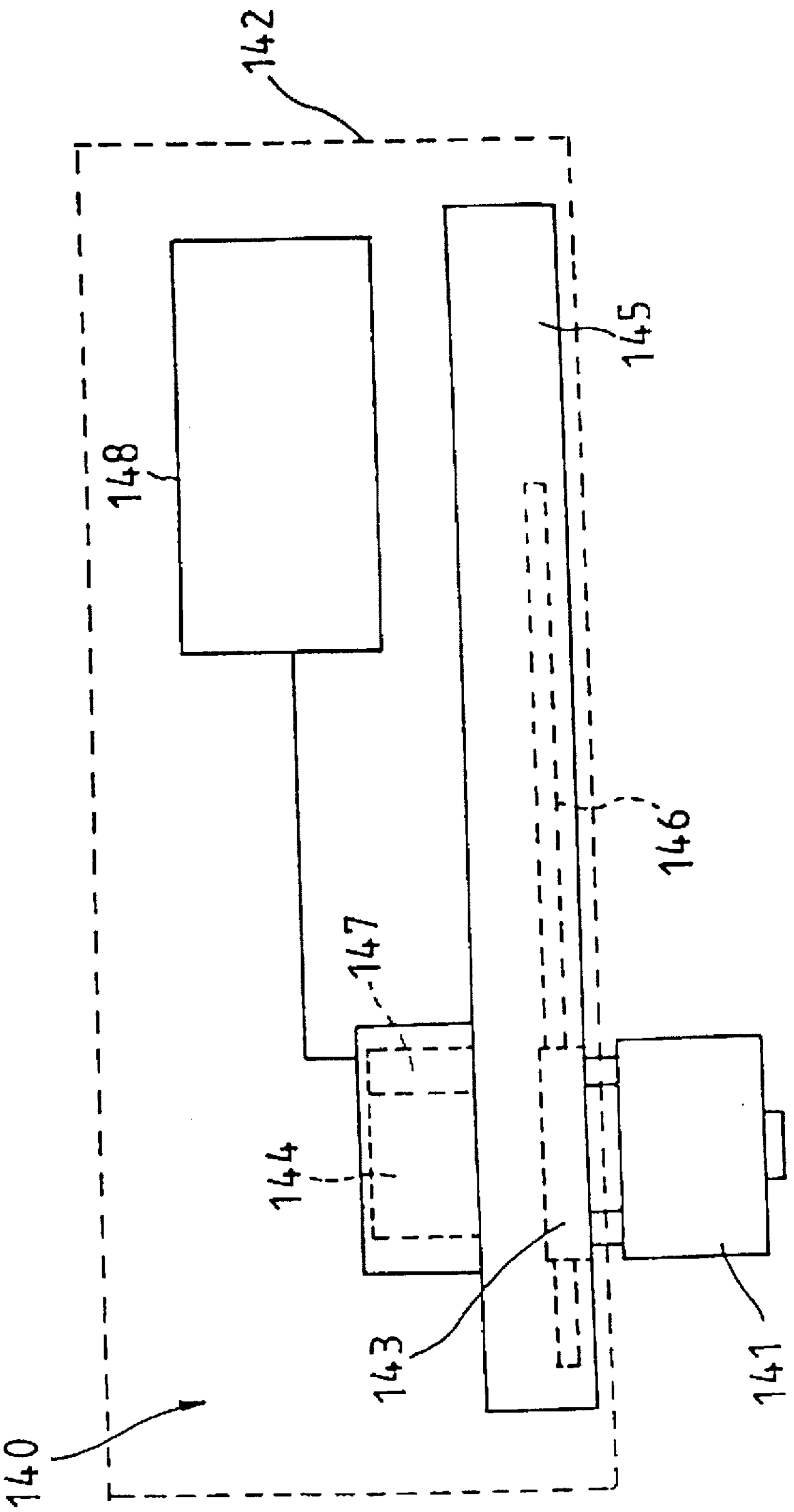
FIG. 3 is a schematic diagram showing an example of the position detector shown in FIG. 2.

FIG. 3 is a schematic diagram showing an example of the position detector shown in FIG. 2. As shown in FIG. 3, the position detector includes a sensor 141 which can measure the distance to the object by scanning laser beams. The sensor 141 is fixed on the sensor installation equipment 143. The sensor installation equipment 143 is movable along a ballscrew 146 installed on a fitting band 145 by means of a servo motor 144. An encoder 147 for measuring the moving distance of the sensor installation equipment 143 is installed in the servo motor 144. The position detector 140 has a driving panel 148 for controlling to drive the servo motor 144 installed therein. In other words, the sensor 141 can scan laser beams and at the same time move linearly along the ballscrew 146.

Figure 4:
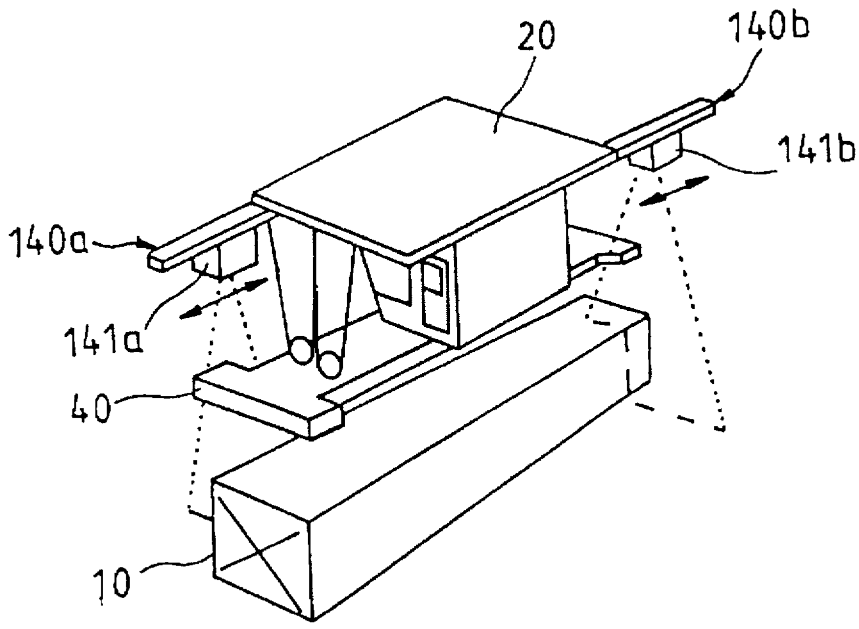
FIG. 4 is a perspective view of a trolley for a crane to which the position detector shown in FIG. 3.

FIG. 4 is a perspective view of the trolley of the crane on which the position detector shown in FIG. 3 is fixed. As shown in FIG. 4, a pair of position detectors 140*a* and 140*b* are on both ends of the trolley 20. Two position detectors 140*a* and 140*b* are preferably positioned diagonally for detecting diagonal edges of the spreader 40 and container 10, as shown. The sensors 141*a* and 141*b* installed in the position detectors 140*a* and 140*b* can scan laser beams in the width direction of the spreader 40 and can be moved in the length direction of the spreader 40 at the same time. That is to say, the position detectors 140*a* and 140*b* can detect diagonal edges of the container 10 by being moving into a necessary position irrespective of the length of the container 10. Of course, the position detectors 140*a* and 140*b* can detect two diagonal edges of the spreader 40. Such position detectors 140*a* and 140*b* can be disposed in a line as necessary. However, it is efficient to dispose the position detectors 140*a* and 140*b* diagonally, as shown in FIG. 4.

The method of measuring the sway angle and skew angle of the spreader using the aforementioned position detectors will be described with reference to FIGS. 5 to 10.

Figure 5:
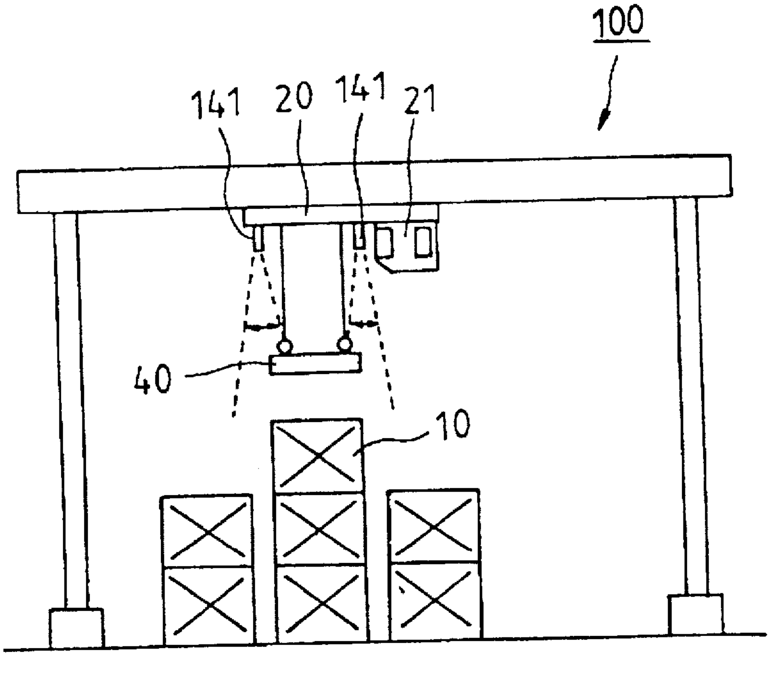
FIG. 5 is a front view of a crane used in a harbor.

FIG. 5 is a front view of the crane used in a harbor. As shown in FIG. 5, containers 10 are loaded on the bottom. A trolley 20 is installed in the crane 100. The trolley is movable left and right. A sensor 141 of the position detector is installed in one side of the trolley 20 and a operating room 21 is installed in the other side thereof. A spreader 40 is tied up in the trolley 20. The laser beams scanned from the sensor 141 faces the spreader 40.

Figure 6:
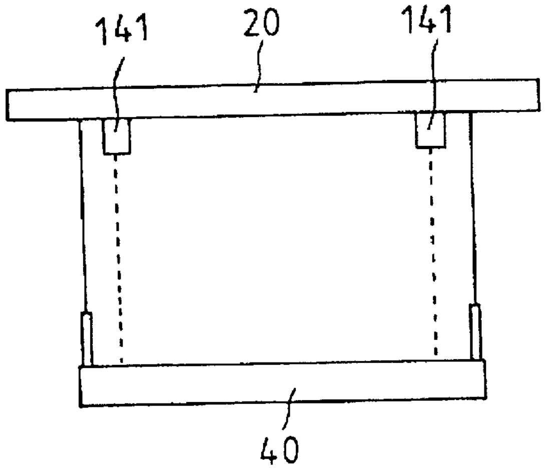
FIG. 6 is a side view of the trolley and spreader shown in FIG. 5.

FIG. 6 is a side view of the trolley and spreader shown in FIG. 5. As shown in FIGS. 5 and 6, the sensor 141 faces the edges around the both ends of the spreader 40. The laser beams by the sensor 141 are scanned in the width direction of the spreader 40 and the sensor 141 is movable in the length direction of the spreader 40 at the same time. In measuring a sway angle or skew angle, the sensor 141 is not necessarily moved in the length direction of the spreader 40.

Figure 7:
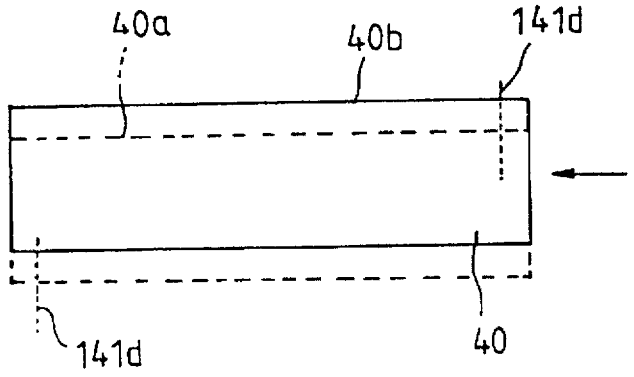
FIG. 7 is a plan view of the spreader in which a sway is generated.

FIG. 7 is a top view of the spreader in which a sway is generated. In FIG. 7, the dotted line 40*a* indicates an initial position of the spreader 40 where the sway and skew are not generated and the solid line 40*b* indicates the position of the spreader 40 where the sway is generated. The vertical points 141*d* are scanning points at which the laser beams are scanned one time in the width direction of the spreader 40.

Figure 8:
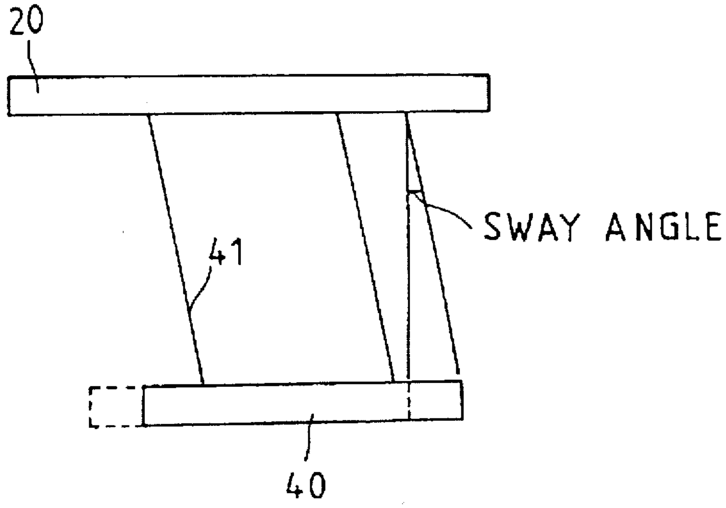
FIG. 8 is a side view of the trolley and spreader when viewed in the arrow direction shown in FIG. 7.

FIG. 8 is a side view of the trolley 20 and spreader 40 when viewed in the arrow direction of FIG. 7 and shows that the sway angle is known by the sway extent of the spreader 40 and the length of a string 41 to which the spreader 40 is hung. That is to say, the sway angle can be known by detecting and comparing the two initial edges of the spreader 40 before the sway is generated with the two edges thereof after the sway is generated. Of course, the length of the string 41 to which the spreader 40 is hung can be known by installing the encoder to the hoist for adjusting the height of the spreader 40.

Figure 9:
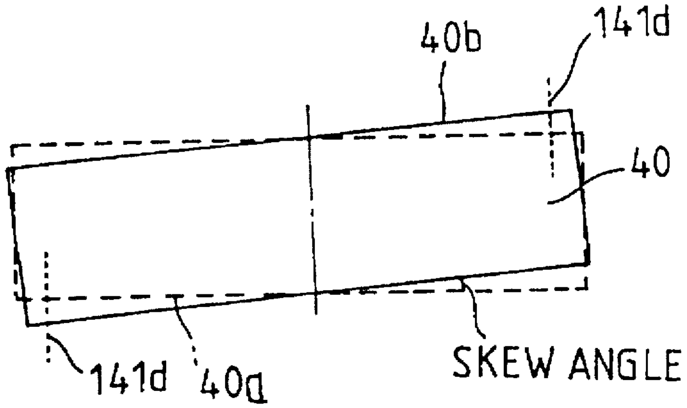
FIG. 9 is a plan view of the spreader in which a skew is generated.

FIG. 9 is a top-plan view of the spreader where the skew is generated. As shown in FIG. 9, a skew angle is the angle formed between a side of the initial spreader 40 indicated in a dotted line 40*a* and a side of the spreader 40 where a skew is generated indicated in a solid line 40*b*. The skew angle is obtained by the variation of edges of a constant point of the spreader 40 and the distance between the center of the spreader at the point. That is to say, the variation of the edges of the constant point of the spreader 40 is measured by the position detector, and the distance between the measuring point and the center of the spreader 40 is measured, thereby enabling to know the skew angle. Of course, in order to know whether only the sway is generated in the spreader 40 or not, the variation of the edges of two left and right ends should be detected, as shown in FIG. 9.

Figure 10:
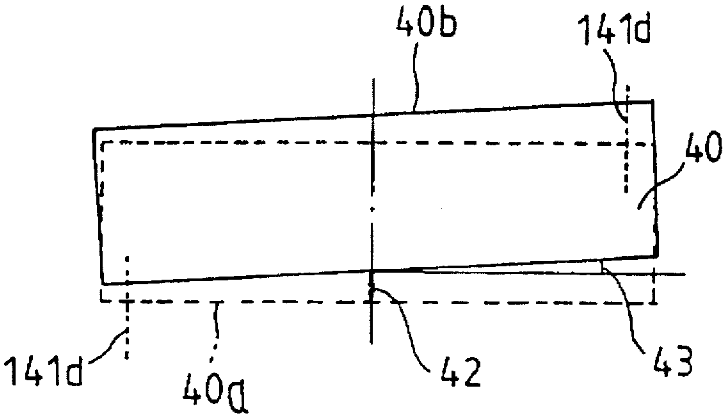
FIG. 10 is a plan view of the spreader in which a sway and skew are simultaneously generated.

FIG. 10 is a top-plan view of the spreader in which a sway and skew are simultaneously generated. In this case, the average moving distance 42 of the spreader 40 generated by the sway is known also by measuring the variation of two edges with the position detector and the sway angle 43 can be calculated by considering the length of the string. The skew angle 43 is easily obtained by considering the variation of two edges and the distance of two sensors.

Figure 11:
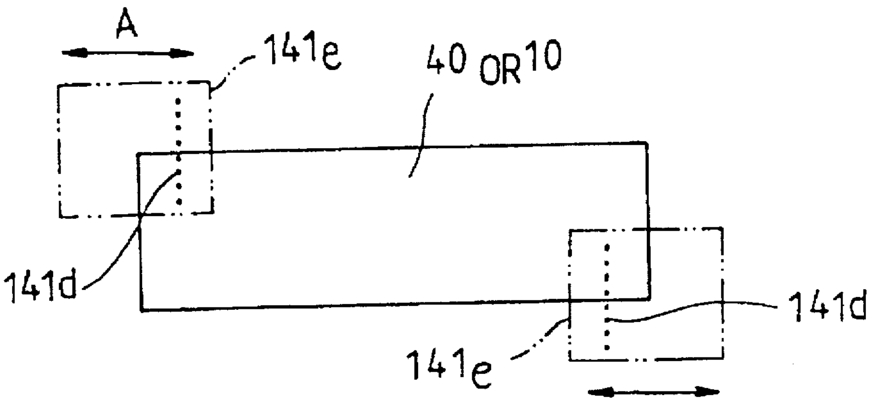
FIG. 11 is a diagram for explaining a method of detecting the position of a spreader or container.

FIG. 11 is a diagram for explaining a method of detecting the position of a spreader or container and shows the top-plan view of the spreader or container. In FIG. 11, the portions indicated by double-dashed lines 140*e* are laser beam scanning areas by the position detector, and the points indicated by dotted lines 141*d* within the scanning areas are points to which the sensor scans once. That is to say, the sensor of the position detector scans the laser beams in the width direction of the spreader 40 or container 10 and moves in the length direction thereof at the same time.

In this way, if the sensor reaches the end of the spreader 40 or container 10, the scanning distance changes sharply. Therefore, the position detector detects both ends of the spreader 40 or container 10, thereby knowing exactly the position and posture of the spreader 40 or container 10. In further way, the two sensors are rotated into a predetermined angle (45 degrees) and laser beams are scanned, thereby detecting the edges of the spreader 40 and container 10 from the trolley and gantry directions. Therefore, the crane changes the position and posture of the spreader 40 or container 10 according to the position information of the spreader 40 or container 10 obtained by the position detector and pick up/drop off the container exactly.

That is to say, the position detector detects the sway information of the spreader while the trolley is moving and supplies the information to the fuzzy controller, and detects the position and posture of the spreader or container so that the spreader can pick up and drop off the container exactly.

Meanwhile, in order to detect the spreader and container, one or more position detector may be installed in the lower trolley. An example of this case will be described with reference to FIGS. 12 to 14.

Figure 12:
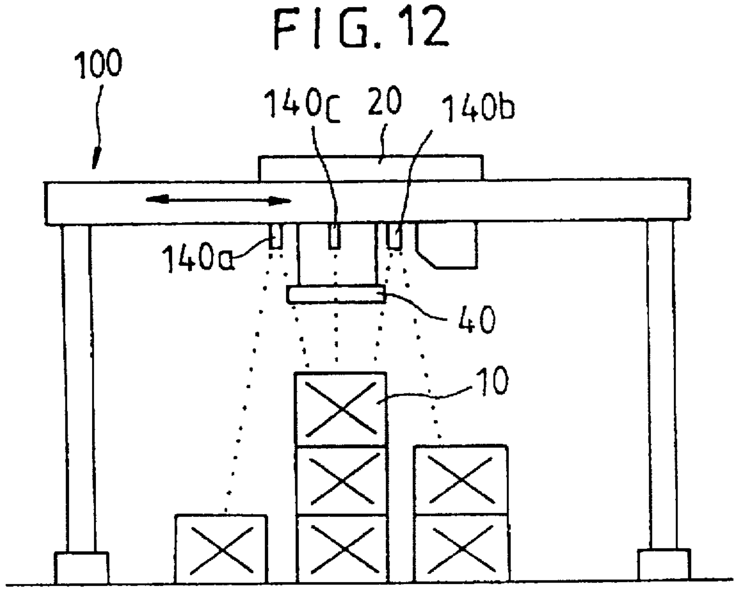
FIG. 12 is a front view of a crane used in a harbor.
Figure 13:
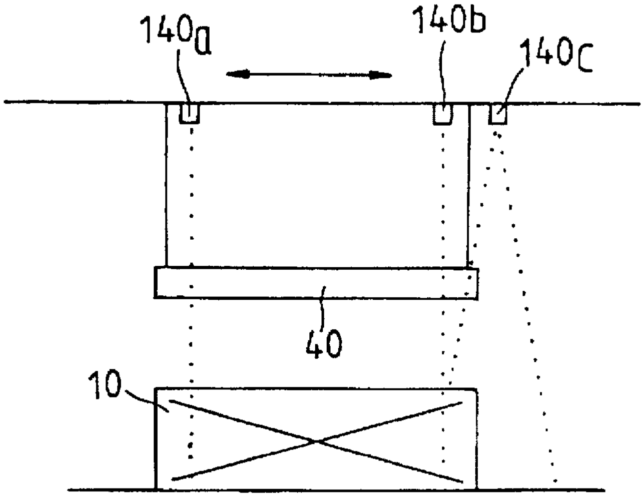
FIG. 13 is a side view of a position detector, spreader and container.

FIG. 12 is a front view of the crane used in a harbor, FIG. 13 is a side view of the position detector, spreader and container. As shown in FIG. 12, three position detectors 140*a*, 140*b* and 140*c* are installed on the crane 100 so as to be move horizontally in the lower trolley 20. Among them, two position detectors 140*a* and 140*b* scan laser beams in the width direction of the spreader 40 and container 10 as in the aforementioned embodiment, and the position detector 140*c* scans laser beams around one end of the length direction of the spreader 40 and container 10 in the length direction of the spreader 40. At this time, the scanning loci of the scanned laser beams are shown in FIG. 14.

Figure 14:
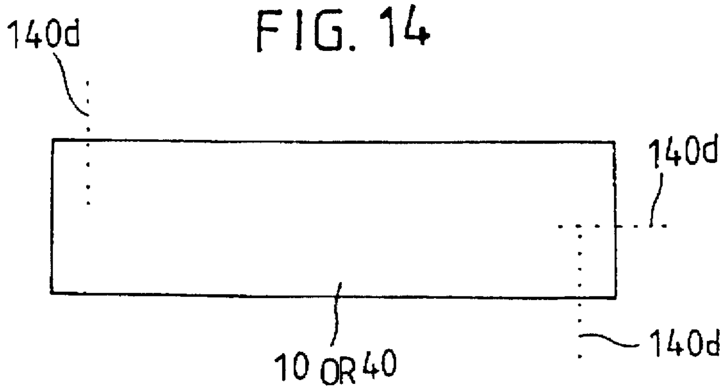
FIG. 14 is a plan view of a spreader or container indicating scanning loci of laser beams.

FIG. 14 is a top-plan view of a spreader or container. As shown in FIG. 14, the scanning loci 140*d* of two laser beams are displayed in the width direction of the spreader 40 or container 10 and the other scanning locus is displayed in the length direction of the spreader 40 or container 10. That is to say, the two position detectors 140a and 140b detect two edges of the width direction of the spreader 40 or container 10 and the other position detector 140c detects an edge of the length direction of the spreader 40 or container 10, thereby detecting the posture of the spreader 40 or container 10 exactly. The posture of the spreader 40 or container 10 can be measured simultaneously by scanning a laser beam one time. In this way, if one more position detector is installed, although two sensors for scanning laser beams in the width direction, do not move in the length direction of the spreader 40 or container 10, differently from those in the aforementioned embodiment, they can detect the position and posture of the spreader 40 and container 10.

Figure 15:
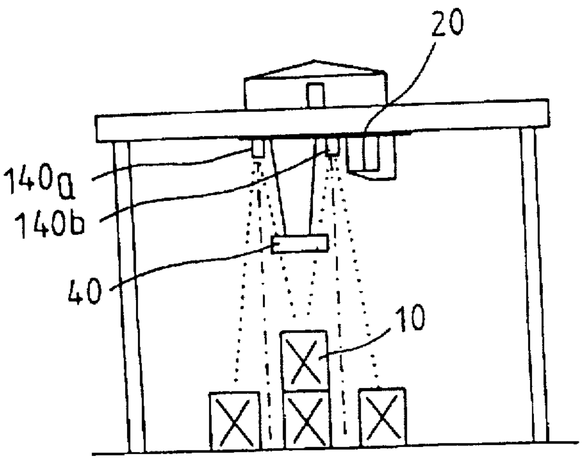
FIG. 15 is a front view showing the whole appearance of a crane which detects the edge of a spreader and container using a position detector.
Figure 16:
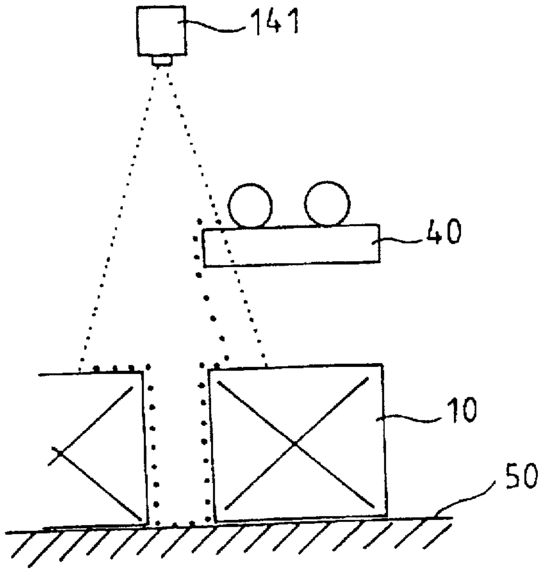
FIG. 16 is a diagram for explaining an edge detecting method of a spreader and container.

FIGS. 15 and 16 show states where the position of the containers loaded in the yard and intervals therebetween are detected. Here, FIG. 15 shows the overall appearance of the crane which detects the edges of the spreader and container with a position detector. If a trolley 20 to which a pair of position detectors 140a and 140b are attached moves to reach a target container 10, the position detectors 140a and 140b detects the edges of the spreader 40 and container 10, thereby recognizing the position and posture of the spreader 40 and container 10. At this time, the principle of detecting the edges will be described in detail with reference to FIG. 16.

FIG. 16 is a diagram for explaining the edge detecting method of the spreader and container. In FIG. 16, the dots marked along the outer surface of the spreader 40 and container 10 are scanning points of the laser beams scanned by the sensor 141. If the sensor 141 scans the spreader 40 and container 10 positioned in the lower portion thereof, the scanning points are positioned on the surface of the spreader 40 and container 10. At this time, the scanning points scanned on the surfaces of the spreader 40 and container 10 are different in their position information. That is to say, scanning points dispersed from the sensor 141 to the exposing surface 50 are divided by a distance and areas where the scanning points existing at each distance exceed a predetermined critical number are divided. Particularly, since there is no components of the crane in the middle of the sensor 140 and spreader 40, the first area among the divided areas are determined as the area of the spreader 40. Also, in order to divide the areas for the spreader 40 and container 10 for sure, the information of the length ranging from the trolley and spreader, supplied from a hoist encoder (not shown) of the crane is considered. That is to say, among the areas of scanning points measured in the sensor 141, the areas being around the hoist encoder values are determined as those for the spreader 40. In this manner, among the scanning points existing in the areas for the spreader 40, the scanning point existing at the end thereof is located and the edge of the spreader 40 is detected with the position information of the very scanning point. In other words, among the scanning points existing in the area for the spreader 40, since the scanning point being at the end has a sharp distance variation, compared with the next scanning point, this portion is recognized as an edge.

As described above, after locating the edge of the spreader 40, among areas composed of the scanning points divided by the critical value, the area of the scanning points excluding the exposing surface 50 and the area for the spreader 40 is determined as the container 10. The edge of the container 10 is also detected in the same method as that of detecting edge of the spreader 40 as described above. In other words, the edges of the spreader 40 and container 10 are detected, thereby sensing the position and posture of the spreader 40 and container 10.

Figure 17:
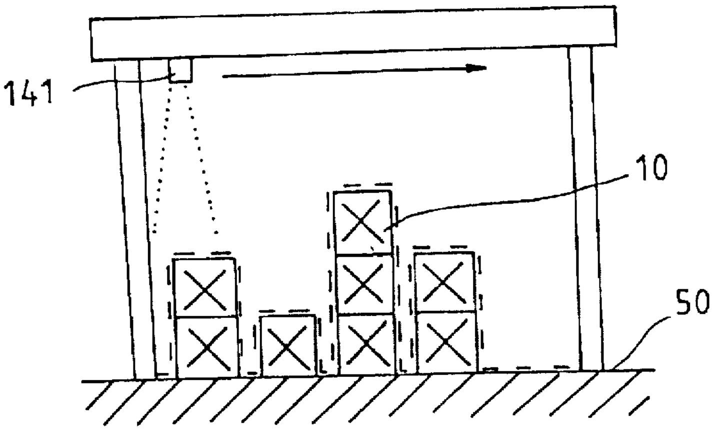
FIG. 17 is a diagram for explaining a method for detecting the loading status of the containers piled in a yard using a position detector.

FIG. 17 is a diagram for explaining the method of detecting with a position detector the load status of the containers loaded in the yard. As shown, a plurality of containers 10 are loaded on the exposing surface 50 in rows. The containers 10 loaded in rows in such a manner are piled in several tiers. Such a state of the yard is determined by the height of the containers 10 with a sensor 141 of the position detector while moving a trolley (not shown). At this time, the position detector detects the position of the trolley by means of a trolley encoder and scans laser beams. The number of rows of the containers 10 is detected from the exposing surface area with the areas of the scanning points. The number of tiers depending on the number of rows of the containers 10 is determined by obtaining the distance from the exposing surface 50 to the surface of the containers 10. Of course, at this time, since the value of the height of the containers 10 is stored in a crane controller, the number of tiers can be calculated using the value.

Figure 18:
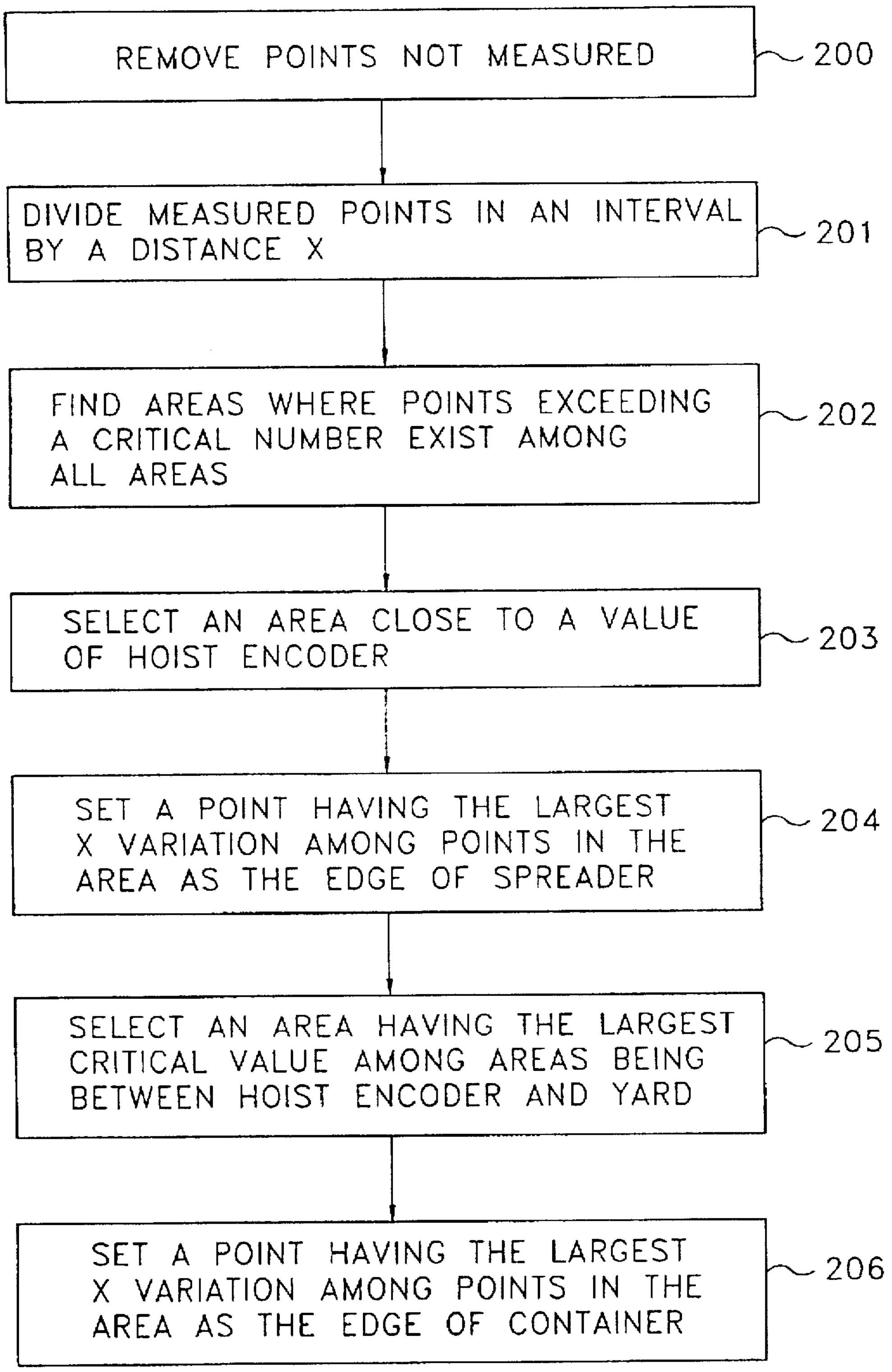
FIG. 18 is a flowchart showing the sequence of a method for determining the position of a spreader and container using a position detector.

FIG. 18 is a flowchart showing the sequences of the method of determining the positions of the spreader and container with a position detector. Laser beams are scanned into the spreader and container with a sensor and among the scanning points, the points which are not measured are removed (step 200). The thus measured scanning points are divided by a interval depending on the distance (step 201). At this time, the divided scanning points are divided into areas where the scanning points exceeding a critical number exist and an area close to the measured value of the hoist encoder is selected as the spreader (steps 202 and 203). The point where the distance is sharply changed is selected in the spreader area detected in that way and is set as the edge of the spreader (step 204). Meanwhile, in the divided areas, the area having the largest critical value is selected among the spreader area and areas between the exposing surface and is determined as the container, a point where the distance variation is sharp is selected and is determined as the edge of the container, as described above (steps 205 and 206). As described above, if the edges of the spreader and container are detected, the positions of the spreader and container can be easily determined.

Figure 19A:
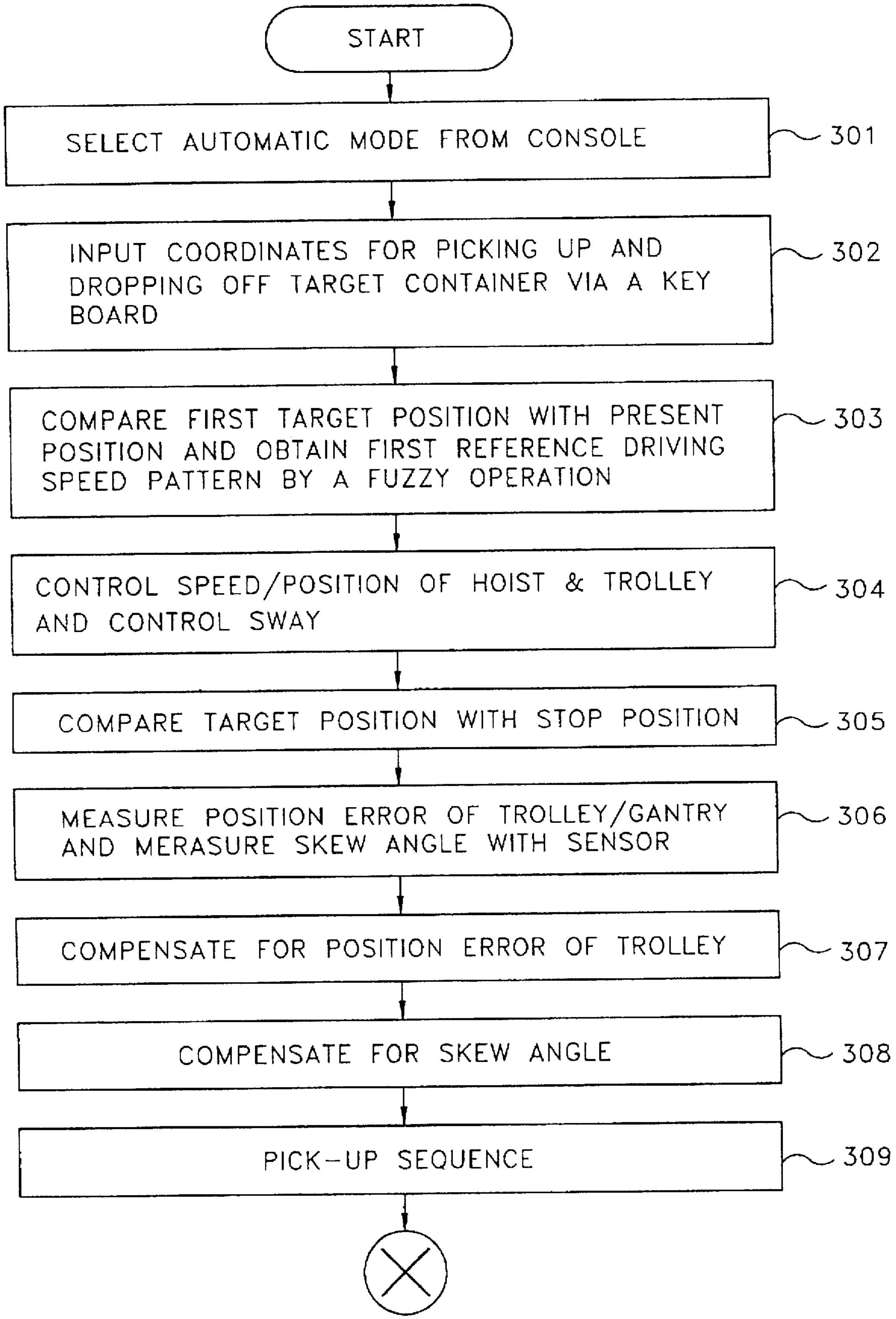
FIGS. 19A and 19B are a flowchart for explaining the overall operation of the crane on which an unmanned driving apparatus for a crane according to the present invention is installed.
Figure 19B:
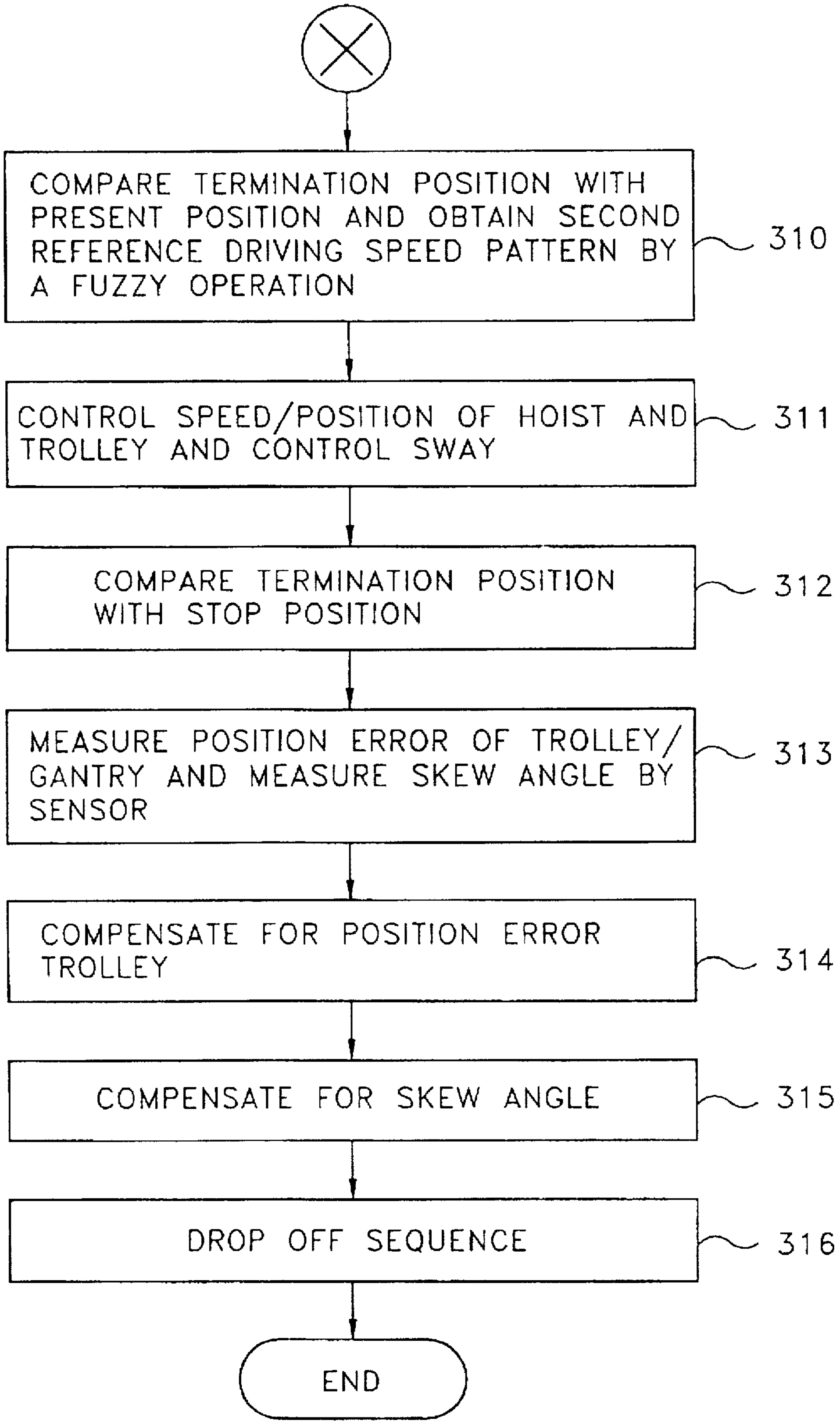

FIGS. 19A and 19B are a flowchart for explaining the overall operation of the crane having an unmanned driving apparatus for a crane according installed therein. Referring to FIG. 19, the overall operation of the crane will be described. An automatic mode is selected by a console and a first target position for picking up a target container and a second target position for dropping off the target container are input via a key board (step 301 and 302). At this time, coordinates are input in a matrix with respect to a tier and row of the first and second target positions. A controller compares the first target position and the present position in a state where the container is not picked up and obtains a primary reference driving speed pattern for driving a trolley or hoist through a fuzzy operation (step 303). While travelling according to the obtained primary reference driving speed pattern, the sway angle is measured with a sensor to compensate the primary reference driving speed pattern through the fuzzy operation and the actual speed pattern is obtained.

According to the compensated actual speed pattern, the driving speed or position of the hoist/trolley is controlled and the sway is controlled (step 304). Then, after comparing a first target position and a stop position, the trolley/gantry position error and skew angle of the spreader are measured (steps 305 and 306). The position error of the trolley is compensated according to the data obtained by the sensor and the skew angle is also compensated (steps 307 and 308). The spreader whose skew angle is compensated proceeds to a process for picking up the container (step 309), which will be describe in detail with reference to FIG. 20 later.

After the pick-up process, the second target position (termination position) input in step 302 and the present position are compared and a secondary reference driving speed pattern is obtained by a fuzzy operation (step 310). While travelling according to the obtained secondary reference driving speed pattern, the sway angle is measured with a sensor to compensate the secondary reference driving speed pattern through the fuzzy operation and the actual speed pattern is obtained. According to the compensated actual speed pattern, the driving speed or position of the hoist/trolley is adjusted and the sway is controlled (step 311). If the termination position is reached, after comparing the termination position with the stop position, the trolley/gantry position error is measured and the skew angle of the spreader is also measured (steps 312 and 313). The position error and skew angle of the trolley are compensated with the thus measured position error and skew angle of the trolley (steps 314 and 315). After compensation, the spreader is descended to land the container (step 316). The drop-off sequence will be described in detail with reference to FIG. 21 later.

Figure 20:
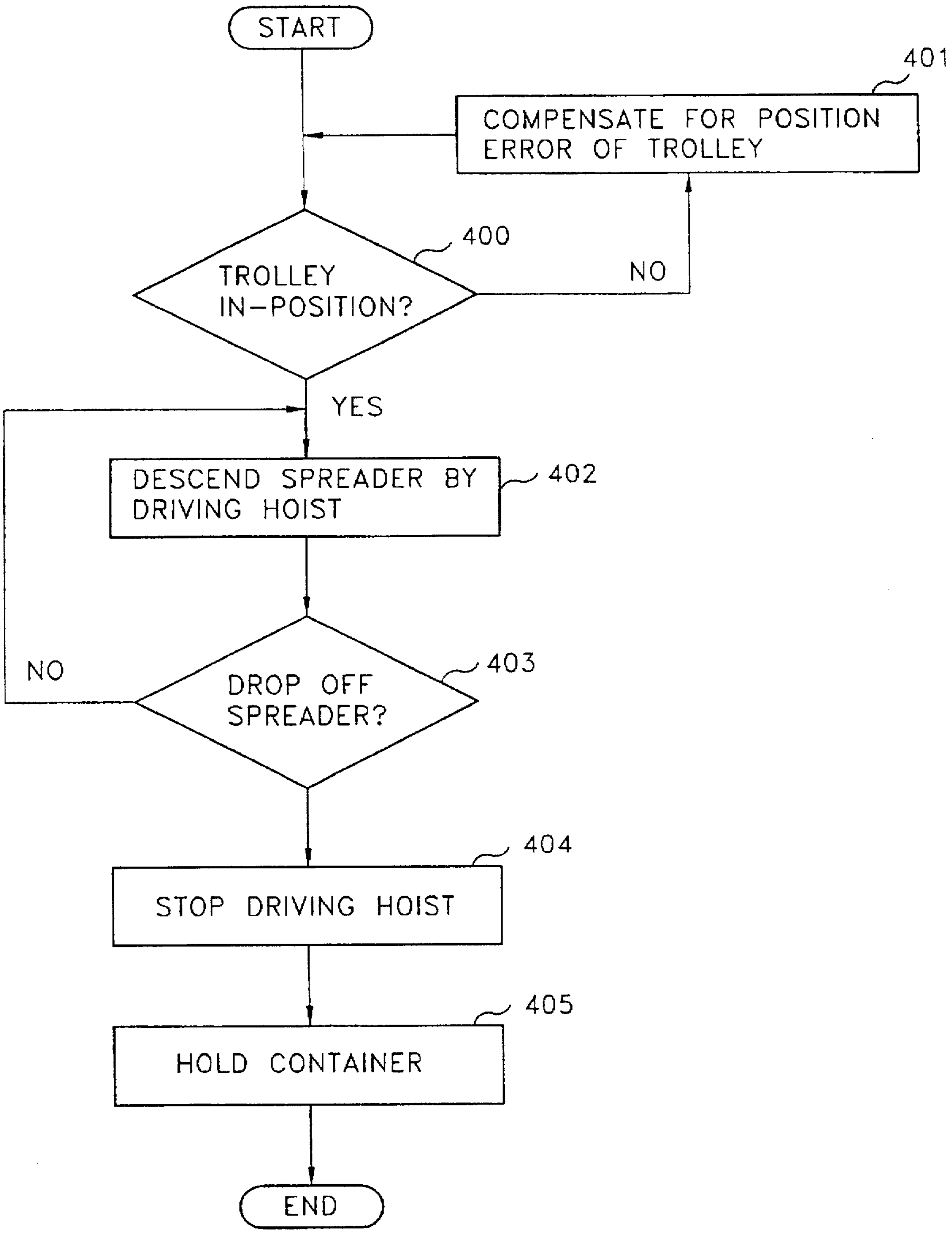
FIG. 20 is a flowchart for explaining in detail the pick-up operation shown in FIG. 19.

FIG. 20 is a flowchart for explaining in detail the pick-up operation shown in FIG. 19. If the trolley stops at a target position, it is determined whether the trolley is in the holding position (step 400). At this time, if the trolley is not in the holding position, the position of the trolley is corrected due to the error and the position of the trolley is again determined (steps 401 and 400). On the other hand, if the trolley is in the holding position, the hoist is driven to descend the spreader (step 402). Then, it is determined whether the spreader is dropped off on the holding position of the container (step 403). If the spreader is not dropped off, the process is fed back to steps 402 and 403 until the spreader is dropped off on the container. After the drop-off, the process proceeds to step 404. Meanwhile, if it is determined that the spreader drops off the container, driving the hoist is stopped and the container is held with the spreader to lift the container (steps 404 and 405).

Figure 21A:
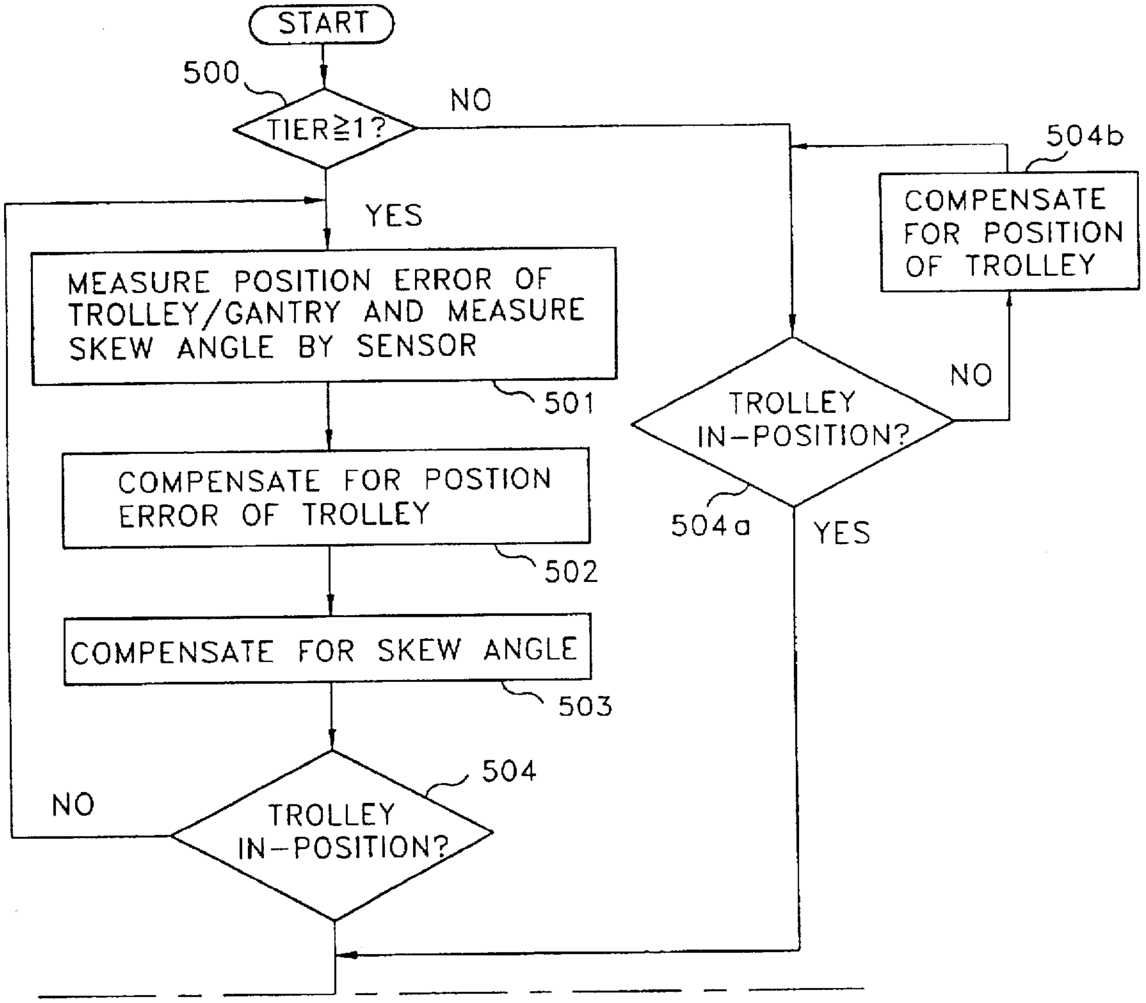
FIGS. 21A and 21B are a flowchart for explaining in detail the drop-off operation shown in FIG. 19.
Figure 21B:
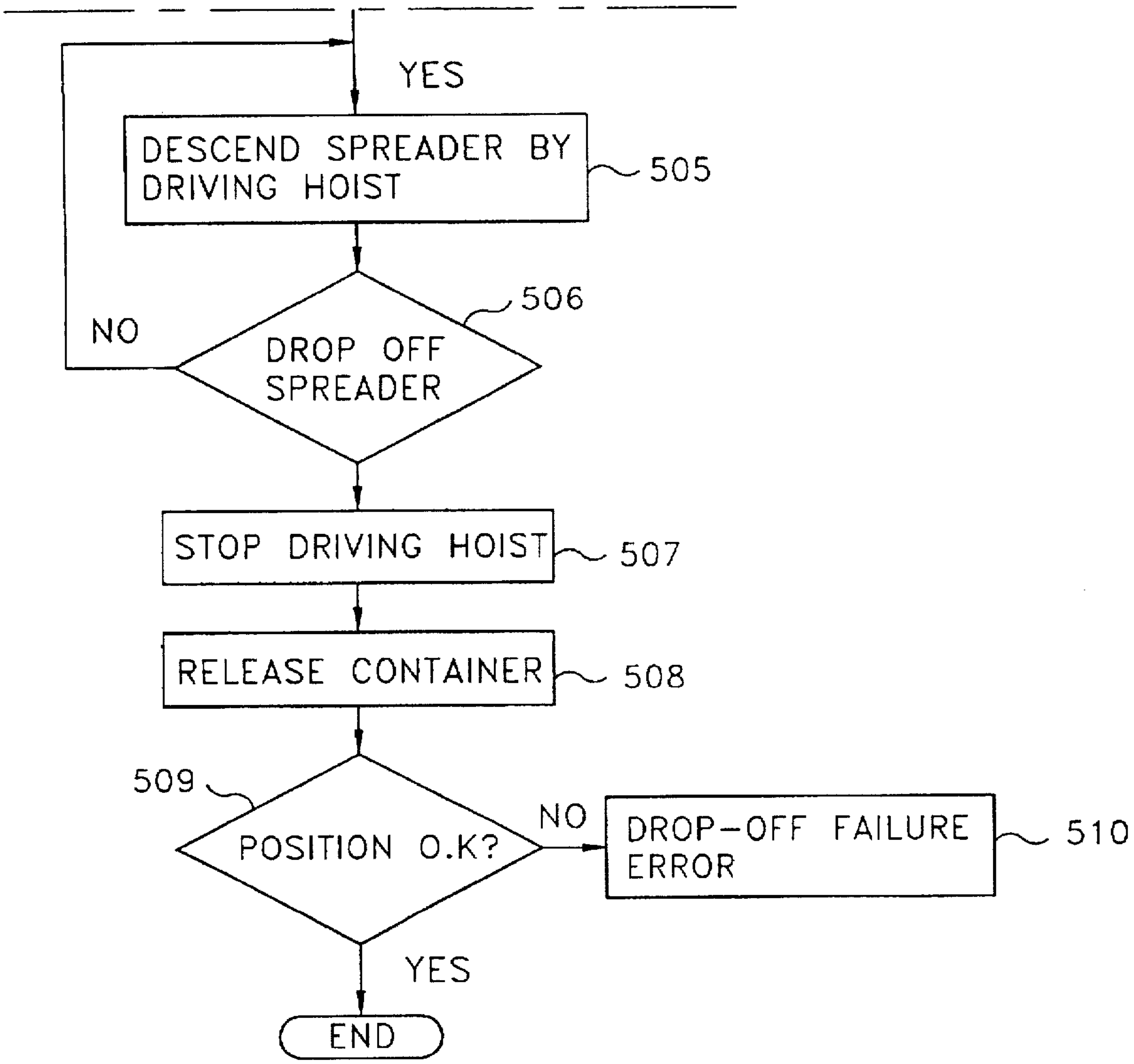

FIGS. 21A and 21B are a flowchart for explaining in detail the drop-off operation shown in FIG. 19.

If the crane stops travelling in the direction of the gantry and the trolley moves to a target position to stop, it is determined whether other containers are piled up in the lower target container. That is to say, it is determined whether the tier of the container is greater than one and the load positions of other containers piled in the lower container and the target container are detected to measure the position error of the trolley/gantry direction and the skew angle of the spreader if greater than one (steps 500 and 501). After compensating the position error or the trolley and skew angle of the spreader according to the measured error values, it is determined whether the trolley is in the permit position (steps 502, 503 and 504). Of course, at this time, if the trolley is not in the permit position, the steps 501 to 504 are repeated. Meanwhile, in step 500, if the tier of the container is smaller than one, which means that other containers are not piled up in the lower container, it is determined whether the trolley is in the permit position of the target position by the signal of encoder (step **504*a*). At this time, if the target container is not in the permit position, the position compensation is made by the trolley encoder (504*b*). If the target container is in the permit position, the hoist is driven to descend the spreader holding the container (step 505). In this manner, the processes of determining whether the drop-off is made or not are repeated while descending the spreader. If the container is dropped off, the drive of the hoist is terminated (steps 506 and 507). After terminating to drive the hoist, the container is released from the spreader (step 508). Thereafter, the execution is terminated if the container is released from the spreader (step 509). On the other hand, if the container is not released from the spreader, a drop-off failure error is displayed (step 510**).

As described above with reference to FIGS. 2 to 21, in the unmanned operating method for a crane according to the present invention and the apparatus therefor, since the sway of the spreader due to the disturbance like the wind or the position error of the trolley is compensated, the sway of the spreader is not nearly produced when the spreader stops at a target position. Therefore, using the unmanned operating method for a crane according to the present invention and the apparatus therefor takes less time in holding and releasing containers. Also, since the unmanned operating method for a crane according to the present invention and the apparatus therefor can detect the positions of the spreader and container exactly so as to hold and release the container without an operator, the unmanned driving of a crane is allowed.

While only certain embodiments of the invention have been specifically described herein, it will apparent that numerous modifications may be made thereto without departing from the spirit and scope of the invention.

What is claimed is:

1. An unmanned driving apparatus for a crane having a spreader for holding/releasing a container being in a first target position and for moving the container to a second target position, said apparatus comprising:

position information inputting means for inputting the position information of said first target position and said second target position;

a fuzzy logic controller having a speed pattern generator for calculating the reference driving speed pattern of said crane according to said position information and a fuzzy operation controller for performing a compensation of said reference driving speed pattern at each point of time depending on external error factors and a predetermined spreader sway information when driving said crane according to said reference driving speed pattern, for allowing said spreader to stop at said second target position with less sway utilizing said compensated reference driving speed pattern, wherein said fuzzy operation controller executes said compensation of said reference driving speed pattern according to a difference between the present state of a trolley and a corresponding target state, a difference between the present state of a hoist and a corresponding target state, a difference between the present driving speed of said trolley and said hoist and the driving speed obtained from said reference driving speed pattern, and a difference between the present sway angle supplied by a position detector and the target sway angle; and said position detector further providing said sway information of said spreader to said fuzzy logic controller during the movement of said spreader and detecting the positions of said spreader and said container when said spreader reaches one of said first target position and said second target position so that said fuzzy logic controller precisely controls said spreader to attach/detach said container based on the detected positions of said spreader and said container.

2. The unmanned driving apparatus for a crane as claimed in claim 1, wherein said calculated reference driving speed pattern comprises reference driving speed pattern for both said hoist for moving said spreader up and down and said trolley for moving said spreader horizontally.

3. The unmanned driving apparatus for a crane as claimed in claim 2, wherein said speed pattern generator obtains each primary driving speed pattern of said trolley and said hoist according to said position information and adjusts said obtained primary driving speed pattern through a simulation depending on the position of said trolley, the driven state of said hoist, a difference between the present position and target position due to the sway angle of said spreader, a difference between the present accelerated speed and target speed, to obtain said reference driving speed pattern.

4. The unmanned driving apparatus for a crane as claimed in claim 2, wherein said position detector has a sensor for measuring the distance from a predetermined object by scanning a laser beam with a constant angle range, a sensor installation equipment having said sensor installed therein and movable in the length direction of said spreader and an encoder for measuring the moving distance of said sensor installation equipment.

5. The unmanned driving apparatus for a crane as claimed in claim 4, wherein two of the position detectors are diagonally disposed in a lower portion of said trolley.

6. The unmanned driving apparatus for a crane as claimed in claim 5, wherein the sensor in each diagonally disposed position detector scans laser beams in the width direction of said spreader.

7. The unmanned driving apparatus for a crane as claimed in claim 6, wherein one more position detector having a sensor for scanning laser beams in the length direction of said spreader is provided in the lower portion of said trolley.

8. An unmanned operating method for a crane having a spreader for holding/releasing a container being in a first target position and for moving the container to a second target position, said method comprising the steps of:

inputting the position information of said first target position and said second target position;

calculating a reference driving speed pattern according to said input position information;

detecting and inputting a sway angle of said spreader to a fuzzy operation controller while driving said crane according to said reference driving speed pattern;

compensating said reference driving speed pattern by said fuzzy operation controller according to a difference between the present state and target state of said crane and a difference between the present sway angle supplied by a position detector and a target sway angle; detecting the positions of said spreader and said container and stopping at said second target position utilizing the compensated reference driving speed pattern;

adjusting the position of said spreader according to said detected positions of said spreader and said container; and picking up/dropping off said container based on the adjusted position of said spreader.

9. The unmanned operating method for a crane as claimed in claim 8, wherein said calculated reference driving speed pattern comprises reference driving speed pattern for both a hoist for moving said spreader up and down and a trolley for moving said spreader horizontally.

10. The unmanned operating method for a crane as claimed in claim 9, wherein said reference driving speed pattern is obtained such that each primary driving speed pattern of said trolley and hoist is obtained according to said position information, said obtained primary driving speed pattern is adjusted through a simulation depending on the position of said trolley, the driven state of said hoist, a difference between the present position and target position due to the sway angle of said spreader, a difference between the present speed and target speed and a difference between the present accelerated speed and said target speed.

11. The unmanned operating method for a crane as claimed in claim 9, wherein said sway angle detecting step of said spreader includes the steps of:

detecting two initial edge positions of said spreader having no sway by scanning laser beams;

detecting two changed edge positions of said spreader when said trolley is travelling by said scanning laser beams; and comparing said two initial and changed edge positions of said spreader to determine the sway angle of said spreader considering the length of a string to which said spreader is hung.

12. The unmanned operating method for a crane as claimed in claim 11, wherein said reference driving speed is compensated according to a difference between the present state of said trolley and a corresponding target state, a difference between the present state of said hoist and a corresponding target state, and a difference between the present driving speed of said trolley and said hoist and the driving speed obtained from said reference driving speed pattern.

13. An unmanned operating method for a crane as claimed in claim 10, wherein said step of detecting the positions of said spreader and said container includes the steps of:

scanning laser beams into said spreader and said container, said spreader and said container having a sensor for sensing said scanning laser beams;

dividing scanned points into divided areas according to a distance detected by said scanning laser beams, selecting areas corresponding to said spreader and said container based on a predetermined value, said predetermined value used for selecting the area corresponding to said spreader further corresponding to a distance value of said spreader which is measured by a hoist encoder installed in said crane; and detecting edges of said spreader and said container with said selected areas of said spreader and said container.

14. The unmanned operating method for a crane as claimed in claim 13, wherein said laser beams are scanned to a predetermined angle (45 degrees) while said sensor moving toward two diagonal edges of said spreader and said container in each length direction.

15. The unmanned operating method for a crane as claimed in claim 13, wherein the edges of said spreader and said container detected in said edge detecting step are boundaries of scanning points at which the distance changes sharply among said detected areas of said spreader and said container.

16. The unmanned operating method for a crane as claimed in claim 15, wherein in said step of detecting positions of said spreader and said container, the skew angle of said spreader and said container is obtained by comparing said detected edges of said spreader and said container with initial edges thereof.

17. The unmanned operating method for a crane as claimed in claim 13, wherein in said dividing step, the areas where scanning points exceeding a critical number exist are scanned and divided among all areas of scanning points.

18. The unmanned operating method for a crane as claimed in claim 13, wherein said laser beams are scanned in the width direction while said sensor moving toward two diagonal edges of said spreader and said container in each length direction.

19. The unmanned operating method for a crane as claimed in claim 18, wherein in said laser beam scanning step, said laser beams are further scanned toward one end of the length direction of said spreader and said container.

20. The unmanned operating method for a crane as claimed in claim 9, wherein said picking-up step includes the steps of:

descending said spreader by driving said hoist;

determining whether said container is picked up or not; and repeating said descending and determining steps if it is determined that said container is not picked up.

21. The unmanned operating method for a crane as claimed in claim 9, wherein said dropping-off step includes the steps of:

descending said spreader by driving said hoist;

determining whether said container is dropped off or not; and repeating said descending and determining steps if it is determined that said container is not dropped off.

22. The unmanned operating method for a crane as claimed in claim 8, further comprising the step of detecting the container load status by detecting the height of container depending on the position of said trolley by scanning laser beams along the rows of containers loaded in the yard.

* * * * *